United States Patent
Gao (10) Patent No.: US 11,996,708 B2
(45) Date of Patent: May 28, 2024

(54) DATA CENTER MULTI-STAGE BACKUP SYSTEM

(71) Applicant: BAIDU USA LLC, Sunnyvale, CA (US)

(72) Inventor: Tianyi Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 255 days.

(21) Appl. No.: 17/219,643

(22) Filed: Mar. 31, 2021

(65) Prior Publication Data

US 2022/0320876 A1 Oct. 6, 2022

(51) Int. Cl.
*H02J 7/00* (2006.01)

(52) U.S. Cl.
CPC ........ *H02J 7/00041* (2020.01); *H02J 7/0014* (2013.01)

(58) Field of Classification Search
CPC . H01M 10/6572; H01M 10/637; Y02E 60/10; H02J 7/00041; H02J 7/0014
See application file for complete search history.

(56) References Cited

U.S. PATENT DOCUMENTS

| | | | |
|---|---|---|---|
| 11,489,349 B2* | 11/2022 | Ono | H02J 7/02 |
| 2008/0136364 A1* | 6/2008 | Calvarese | H01M 10/443 320/101 |
| 2011/0300420 A1* | 12/2011 | Johnson, Jr. | H01M 10/658 429/62 |
| 2013/0234519 A1* | 9/2013 | Maeda | H02J 7/34 307/64 |
| 2013/0239597 A1* | 9/2013 | Mitchell | F25B 25/005 165/104.34 |
| 2022/0166073 A1* | 5/2022 | Despesse | H01M 50/298 |

FOREIGN PATENT DOCUMENTS

| | | | |
|---|---|---|---|
| JP | 2001085073 A | 3/2001 |
| JP | 2005117824 A | 4/2005 |
| JP | 2009118067 A | 5/2009 |
| JP | 2010263668 A | 11/2010 |
| JP | 2013207996 A | 10/2013 |
| JP | 2017126418 A | 7/2017 |
| JP | 2017182881 A | 10/2017 |
| JP | 2019009960 A | 1/2019 |

* cited by examiner

*Primary Examiner* — Richard Isla
*Assistant Examiner* — Sadia Kousar
(74) *Attorney, Agent, or Firm* — WOMBLE BOND DICKINSON (US) LLP (57) ABSTRACT

A first battery of a battery system can include a thermoelectric component (TEC) that produces electric energy from thermal energy that the first battery generates. The TEC is used to charge a second battery of the battery system, while maintaining proper thermal conditions for the first battery. The battery system can be used to support information technology (IT) equipment by acting as backup power during a power outage, and/or to provide supplemental power under peak power conditions.

18 Claims, 5 Drawing Sheets

DATA CENTER MULTI-STAGE BACKUP SYSTEM

FIELD

Embodiments of the present disclosure relate generally to a two-stage battery system that can provide power to information technology (IT) equipment of a data center.

BACKGROUND

Information Technology (IT) includes technology such as computers that are accessible through the internet or a local network, which provide storage of, or access to, data, websites, computer programs, and more.

IT equipment such as servers may perform critical operations that are required to be operational even when grid-power becomes unavailable (e.g., during a power-outage or maintenance). Batteries, such as lithium-ion based batteries, can provide essential backup energy that keep IT equipment running for critical operations when a main power source (e.g., a power grid) is down.

When a battery is operational (e.g., charging or discharging), thermal energy may be produced. The greater the current, and the greater the internal resistance of the battery, the more thermal energy (e.g., watts) can be produced. This thermal energy, which is typically lost, can damage the battery, reduce longevity of the battery, and reduce the overall efficiency of the data center. A cooling effort is required to maintain a storage temperature of the battery so that they do not overheat. Thus, there is a need within development of data centers to manage energy storage efficiently.

A battery room can house backup batteries, to centralize management of the batteries. Lithium-ion batteries can degrade (e.g., reduced energy storage capacity) with the passing of time. The degradation rate of the battery typically depends on storage temperature of the battery. Higher storage temperature typically leads to a faster degradation, yet it requires less cooling effort for the facility to maintain this storage temperature. Thus, there is also a need to manage batteries in a manner that accounts for battery degradation as well as cooling effort of the battery.

It becomes more important to develop advanced technologies to improve energy usage efficiency to decrease the carbon dioxide emissions and eliminate impact on environments from operating large scale IT clusters.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A data center can house and manage operation of IT equipment. The data center can include a battery system to act as a back-up energy source and/or as a supplemental energy source to the IT equipment. For example, the IT equipment may be powered by utility grid. If utility power is down, the IT equipment can be powered by the battery system. Additionally, or alternatively, the battery system can supplement the utility grid (or other power source) during peak power demand, which can occur at times when IT equipment provides especially power-consuming services.

A battery can produce thermal energy when operating (charging and/or discharging), due to current and internal resistance of cells and hardware. This thermal energy can reduce operating efficiency of the data center, especially if the battery cycles (charges and discharges) frequently. To mitigate this loss of efficiency, some of the thermal energy can be harvested and stored.

A battery system can include a first battery having one or more battery cells; a thermoelectric component (TEC) having thermoelectric materials therein to form a hot region and a cold region, the hot region being thermally connected to a region of the first battery, where the TEC is configured to generate a first voltage based on a temperature difference between the hot and cold regions due to thermos electric effect; a voltage converter coupled to the TEC to boost the first voltage produced by the TEC to generate a second voltage that is higher than the first voltage; and a second battery electrically connected to an output of the voltage converter, where the second voltage is utilized to charge the second battery. In such a manner, the thermal energy that is produced by the first battery (e.g., a primary battery module) can be harvested to charge a second battery (an auxiliary battery module). This energy can then be used to power IT equipment at a later time, thereby improving efficiency of the battery system.

Figure 1:
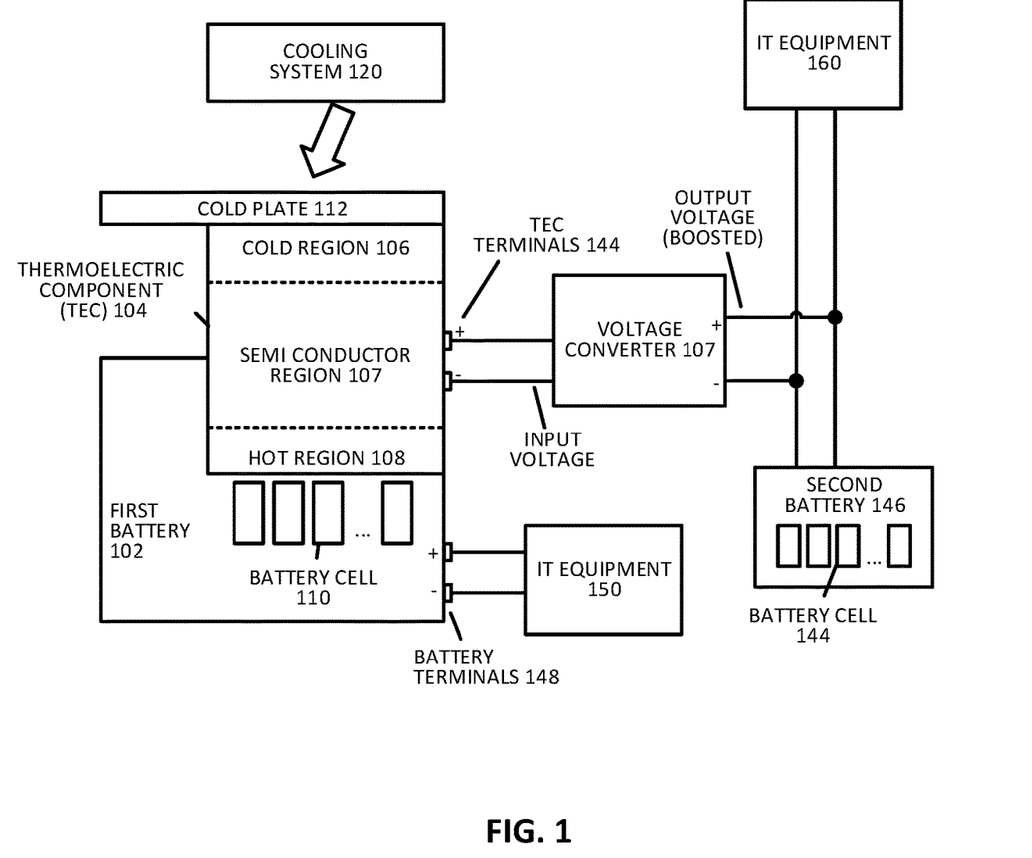
FIG. 1 shows a battery system with thermoelectric component (TEC), according to some embodiments.

FIG. 1 shows a battery system with thermoelectric component, according to some embodiments. A first battery can house one or more battery cells 110. The battery cells can have lithium-ion based chemistry. A thermoelectric component 104 can have thermos electric materials forming a hot region 108 and a cold region 106. The hot region can be connected to an external housing of the first battery, or be located within the housing (e.g., thermally connected to the one or more cells though a hot plate). The cold region can be external to the first battery and/or connected to a cold plate 112, to manage temperature differential between the hot region and cold region. The thermoelectric component can include a semi-conductor region 107, which can be sandwiched between the hot region and the cold region, that includes one or more P junctions and one or more N junctions. The P junctions and N junctions can be electrically connected in series and/or parallel to each other and to TEC terminals 144. Each of the hot region and the cold region can be formed by respective plates (planar in shape) that sandwich the semi-conductor region on opposite sides. The thermoelectric component, which is also known as a thermoelectric cooler or Peltier module, has the semiconductor components arranged to produce electricity through the Peltier effect, Seebeck effect, and/or Thomson effect.

When thermal energy travels from the hot region to the cold region, an electric potential is produced at the TEC terminals due to thermoelectric effect from the thermoelectric materials (e.g., Seebeck effect). The greater the difference in thermal energy, the greater the power output of the TEC. The TEC terminals can be electrically connected to a voltage converter 107, thus serving as an input voltage to the voltage converter.

The voltage converter can include one or more power switching devices (e.g., mosfets, transistors, IGBTs, and/or other semi-conductor devices), one or more inductors, diodes, capacitors, resistors, and other passive or active electronic components that are interconnected in a circuit to boost the input voltage to an output voltage. In some embodiments, the voltage converter can include a boost converter circuit that includes a single low-side control FET. In some embodiments, the voltage converter includes a synchronous boost converter circuit, or other equivalent electronic technology.

The output voltage of the voltage converter is boosted to a higher voltage than the input voltage based on operation of the voltage converter, for example, a duty cycle of one or more power switching devices of the voltage converter can control how much the input voltage is boosted to generate the output voltage. The desired output voltage can be determined based the voltage of the second battery 146 which is connected to the output voltage of the voltage converter. The output voltage of the voltage converter can be regulated to be slightly higher than the voltage input of the second battery to drive current into the second battery, thereby charging the second battery. The output voltage can be current controlled (e.g., based on feedback of how much current is fed into the second battery). Various control techniques and circuits can be implemented to charge the second battery from the TEC output without departing from the scope of the disclosure.

Similar to the first battery, the second battery 146 can also include one or more battery cells 144, which can have lithium-ion based chemistry. Each of the first battery and the second battery can have a capacity that is sized based application and requirements. For example, if the IT equipment requires 12 minutes of back-up energy at a load of 1000 amps, and the IT cluster (a grouping of IT equipment in the data center) is designed to hold 10 first batteries, then each first battery can be sized at 120 watt hrs. Each first battery can have a corresponding second battery associated with it. The second battery can have a smaller capacitance than the first battery, e.g., one fourth of the capacitance of the first battery, or less.

The first battery can include a battery housing that houses the respective battery cells as well as associated electronics known collectively as a BMS (battery management system) that perform cell monitoring, cell balancing, and/or communication with external devices or controllers. The second battery can include its own housing and BMS. In some embodiments, however, the second battery and first battery may share a housing and BMS.

In some embodiments, the first battery uses the TEC, and not another cooling structure, for cooling the first battery. For example, no other cooling systems such as other cooling plates are attached to the first battery. Otherwise, another cooling system could extract thermal energy from the first battery, thus reducing the power produced by the TEC. Cold plate 112 can be other types of cooling components or cooling devices used in other cooling techniques.

The first battery can be electrically connected to IT equipment 150. The second battery can be electrically connected to IT equipment 160. IT equipment 150 and 160 can be the same or different. In some embodiments, IT equipment 160 is a subset of IT equipment 150, for example, equipment that is deemed critical or of high importance. The first battery and second battery can provide power to IT equipment combined or in an alternating manner.

A cooling system 120 can monitor and cool the components of the data center, including the batteries and the IT equipment. In some embodiments, a cold plate 112 is connected to the cold region 106 to help extract thermal energy from the TEC (keeping the cold region cold) during battery operation, thereby increasing the power output of the TEC. In one embodiment, the cooling system is controlled to maintain the cold plate an at optimized condition for the semiconductor region 107 to perform at the optimized region for transferring the thermal energy to electricity. The cooling system can include a liquid cooling system such as, for example, a pump that circulates fluid through one or more channels to and from the cold region or cold plate. Additionally, or alternatively, the cooling system can include an air cooling system such as a fan and/or air conditioning system that directs air at the cold region or cold plate. The cooling system can employ one or more cooling strategies and associated hardware, as discussed further in other sections.

Note that throughout this application, TEC 104 is utilized as an example of a circuit to generate electric energy based on the heat generated from a first battery and use the electric energy to charge a second battery or to provide power to other components such as IT equipment. However, due to the thermoelectric effect of the thermoelectric materials, TEC 104 can also be utilized to operate in either a cooling mode or a heating mode by provide power to the TEC terminals. Such thermoelectric effect is referred to as Peltier effect. A direction of an electric current flowing through TEC 104 will cause TEC 104 to operate in either cooling mode or a heating mode. Thus, dependent on the operating condition at the different points in time, TEC 104 may be configured to operate in a cooling mode or heat mode to cool or warm up battery 110. Alternatively, TEC 104 may also be configured as an electricity generator using its thermoelectric effect, i.e., Seebeck effect. When there is a need to cool or warm battery 110, power is provided to TEC 104. When battery 110 does not need to be cooled or warmed, TEC 104 can be configured to generate electricity to charge another component such as second battery 146. TEC 104 can be dynamically configured dependent upon the specific circumstances.

The thermoelectric effect refers to phenomena by which either a temperature difference creates an electric potential or an electric potential creates a temperature difference. These phenomena are known more specifically as the Seebeck effect (creating a voltage from temperature difference), Peltier effect (driving heat flow with an electric current), and Thomson effect (reversible heating or cooling within a conductor when there is both an electric current and a temperature gradient). While all materials have a nonzero thermoelectric effect, in most materials it is too small to be useful. However, low-cost materials that have a sufficiently strong thermoelectric effect (and other required properties) are also considered for applications including power generation and refrigeration. The most commonly used thermoelectric material is based on bismuth telluride.

Figure 2:
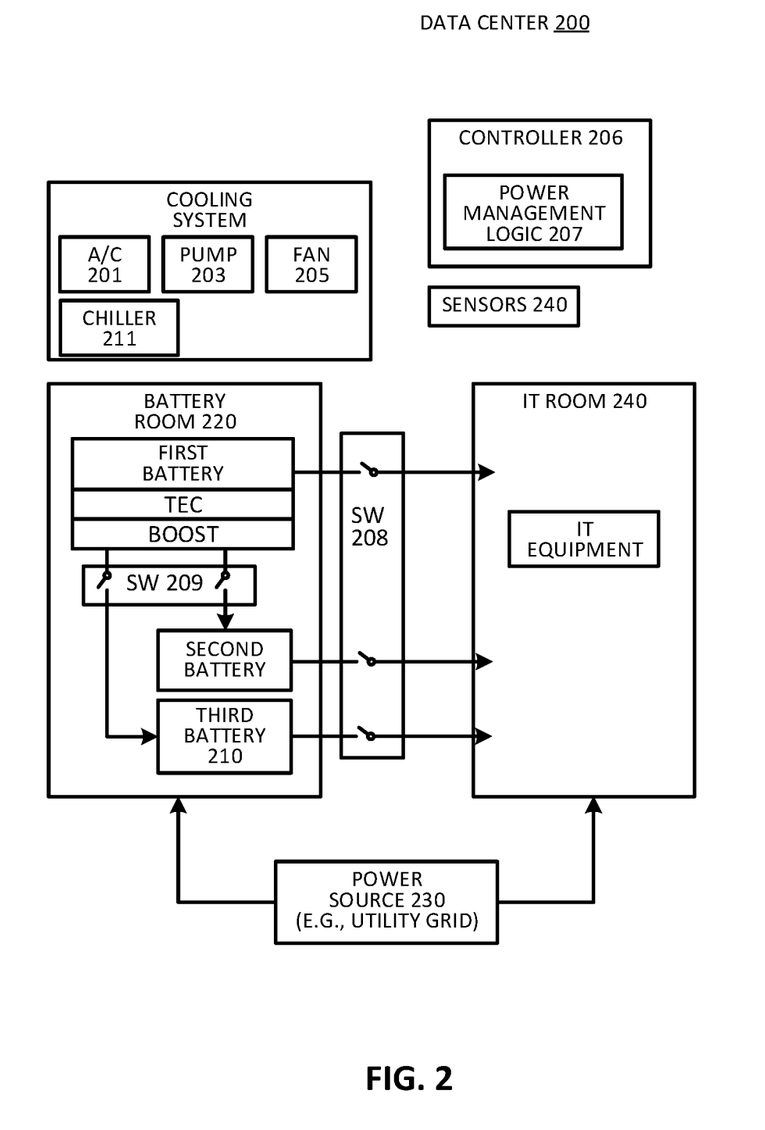
FIG. 2 shows a data center, according to some embodiments.

FIG. 2 shows a data center 200 according to some embodiments. The data center can include a cooling system that manages temperature of various data center components and/or areas such as batteries, IT equipment, a battery room 220 that houses the batteries, or an IT room 240 that houses IT equipment.

The cooling system can include air conditioning 201, a fan 205, and/or a pump 203 for circulation of a coolant fluid. The fluid can be circulated by the pump to the batteries and/or IT equipment. Fluid can be circulated to IT racks and/or to the cold region of the TEC (or cold plate attached to the cold region) through one or more channels, thus transferring thermal energy away the TEC. In some embodiments, the fluid can be actively chilled by a chiller 211 or other refrigeration technology of the cooling system.

Air conditioning can be controlled by the cooling system to maintain a temperature of the battery or an ambient temperature in which the first battery is stored (e.g., in a battery room) to a specified temperature. Additionally, or alternatively, the cooling system can include a fan that is arranged to direct air at the cold region of the TEC or a cold plate that is connected to the cold region of the TEC.

Sensors 240 can include current sensors to monitor electric currents to and from the batteries, voltage sensors of the batteries and the voltage converter, and/or temperature sensors for the batteries and/or ambient temperatures in which the batteries or IT equipment are held.

The first battery and the second battery can be located in battery room 220 of the data center. The batteries can be electrically connected to IT equipment that is located in an IT room 240 of the data center. Controller 206 can be configured to manage a temperature in the battery room with a fan or air conditioner. In some embodiments, the first battery can include a third battery 210. The third battery can be charged in a similar manner as described in FIG. 1.

For example, the third battery can be electrically connected to the voltage output of the voltage converter that boosts a voltage output of the TEC that is thermally coupled to the first battery. In some embodiments, the system can include separate TEC and converter circuits for each auxiliary battery (e.g., a TEC and converter for the second battery, another TEC and converter for the third battery, another TEC and converter for a fourth battery, etc.). Further, multiple primary (e.g., first battery) batteries can be located in the battery room with corresponding auxiliary batteries.

A controller 206 can include power management logic 207 that determines when and which batteries should be used to power IT equipment. The controller can manage battery charging or discharging through one or more switches 209 and 208. The switches can be solid state relays, electro-mechanical relays/contactors, or other equivalent technology.

The first battery (e.g., the primary battery) can be electrically connected to the information technology (IT) equipment of the data center when a power source 230 is absent. For example, if the power source is utility/grid power, and this power is lost due to a power outage, then the first battery can be used as a back-up power source, thereby maintaining the services provided by the IT equipment during the outage. Additionally, or alternatively, the first battery can be electrically connected to the IT equipment as supplement to the power source (e.g., in addition to the power source). This can be performed when an electrical demand of the IT equipment exceeds a threshold, such as during peak loads of the IT equipment.

The auxiliary batteries (e.g., the second battery, the third battery) can be electrically connected to the IT equipment or a portion of the IT equipment. For example, the second battery can be connected to the same IT equipment as the first battery to share the load, or to a separate portion of the IT equipment (e.g., on a separate power bus).

One or more switches 208 and 209 can each include a plurality of individually controllable switches that alternate connection between the second and third battery for charging and/or discharging the second and third battery. For example, when the second battery reaches a threshold charge (e.g., becomes 'full'), the charge circuit to the second battery can be opened and a charge circuit to the third battery can be closed. As such, thermal energy can continue to be harvested by the third battery when the second battery becomes full.

Similarly, the second battery can be connected to power the IT equipment. When the second battery discharges to a certain threshold (e.g., 10% remaining capacity or less), the third battery can be connected to the IT equipment to take the second battery's place. The controller can measure capacity based on open voltage readings of batteries and/or current monitoring.

It should be noted that, in FIG. 2, some power electronic circuits such as converters that convert AC/DC from the power source 230 to the batteries are not shown. Similarly, inverters that convert DC voltage from the batteries to AC voltage to power the IT equipment are not shown. Such converters can comprise power switching devices (e.g., mosfets, transistors, IGBTs, and/or other semi-conductor devices), diodes, capacitors, resistors, inductors, and other passive or active electronic components that are arranged in a converter circuit to actively rectify an AC voltage source to DC voltage, or convert a DC voltage to another DC voltage (e.g., a boost converter). An inverter can also include such electronic components arranged in an inverter circuit to convert DC voltage to AC voltage.

Figure 3:
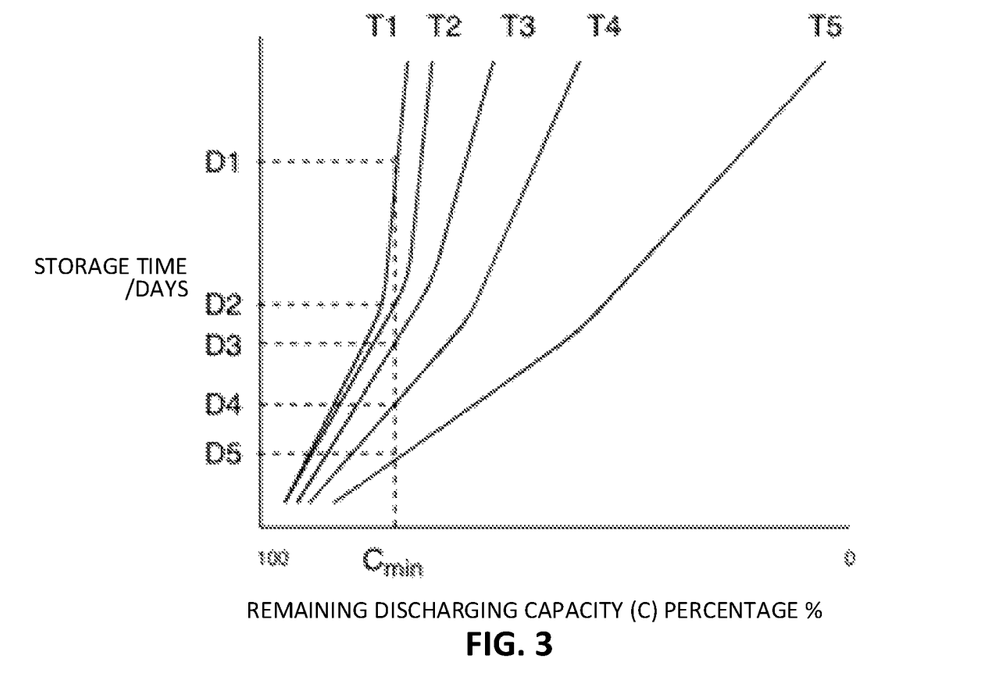
FIG. 3 shows a relationship between storage time and battery capacity.

FIG. 3 shows a relationship between storage time and battery capacity. This relationship is temperature dependent. T1 to T5 are five example battery storage temperatures, in ascending order. T1 represents a low temperature, and T5 represents a high temperature. For a minimum required remaining discharging capacity, Cmin, the corresponding storage time (D1-D5) can be seen for each corresponding temperature profile. For example, D1 can represent the maximum number of days a battery can be stored at temperature T1 such that the battery still meets the minimum discharge requirement (e.g., 70% discharge capacity). As such, FIG. 3 shows that within the temp range (T1-T5), the remaining discharging capacity of the battery decreases as the storage temperature of the battery increases (e.g., an inverse relationship).

Figure 4:
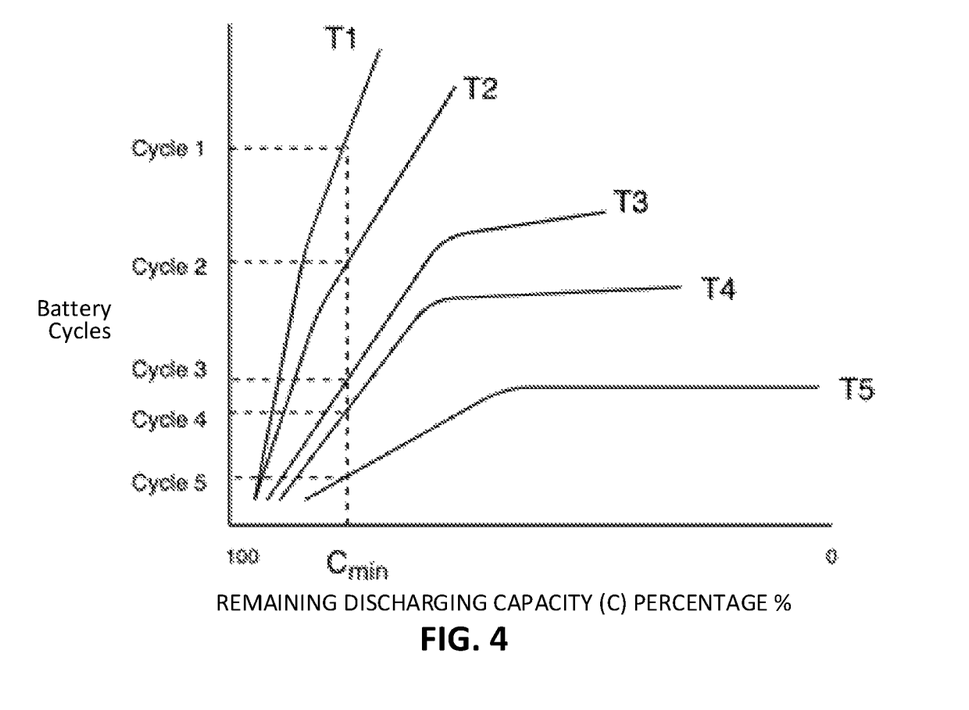
FIG. 4 shows a relationship between battery cycles and discharge capacity

FIG. 4 shows a relationship between battery cycles and discharge capacity. A single battery cycle can represent a charge and discharge of a battery at a substantial percentage (e.g., 80% or greater). Cycle 1 can represent a first number of cycles at temperature T1 where the battery satisfies Cmin. Cycle 2 can represent a second number of cycles greater than those of Cycle 1, that satisfies Cmin, and so on. Cycle 5 represents the greatest number of cycles in the group. Similar to the previous figure, FIG. 4 that shows that the remaining discharging capacity increases as the temperature decreases, and vice versa. Thus, battery life is prolonged with a reduced storage temperature, but at a considerable effort.

The effort to prolong the life by maintaining a low battery storage (which can be an ambient temperature or battery temperature) can be defined in various terms such as, for example, a monetary cost (e.g., an electrical cost to power and air conditioners, fans, etc.), or an energy efficiency (e.g., total watts). As discussed, the TEC operates by generating electric power from temperature differential between the hot and cold regions of the TEC. The higher the temperature differential, the better the power generation. Thus, high temperature differential implies that the cold region is cooled with high effort, which comes with a cost. It follows that an optimal temperature would factor the benefit of the energy harvested by the TEC against the cost of cooling the cold region of the TEC, although such cooling may only be needed during times where the battery is active.

In some embodiments, the controller is configured to maintain an optimized ambient temperature in which the first battery is stored in. The optimized ambient temperature can be determined based on an estimated effort to cool the first battery, an estimated capacity of the first battery relative to storage duration and temperature, and a thermal characteristic of the TEC. The optimized ambient temperature can be determined by minimizing a cost function that includes minimizing the effort required to cool the first battery (e.g., air conditioning, fan, etc.), minimizing effort to replace the first battery due to battery degradation, and maximizing the output of the TEC which is stored as energy in the auxiliary batteries. The cost function can be minimized using regression (e.g., linear regression), to determine the optimized ambient or battery temperature. As such, harvesting of thermal energy using the TEC can be accounted for when optimizing management of the battery systems. The optimization can be adaptive (e.g., changing overtime), as shown in FIG. 5.

Figure 5:
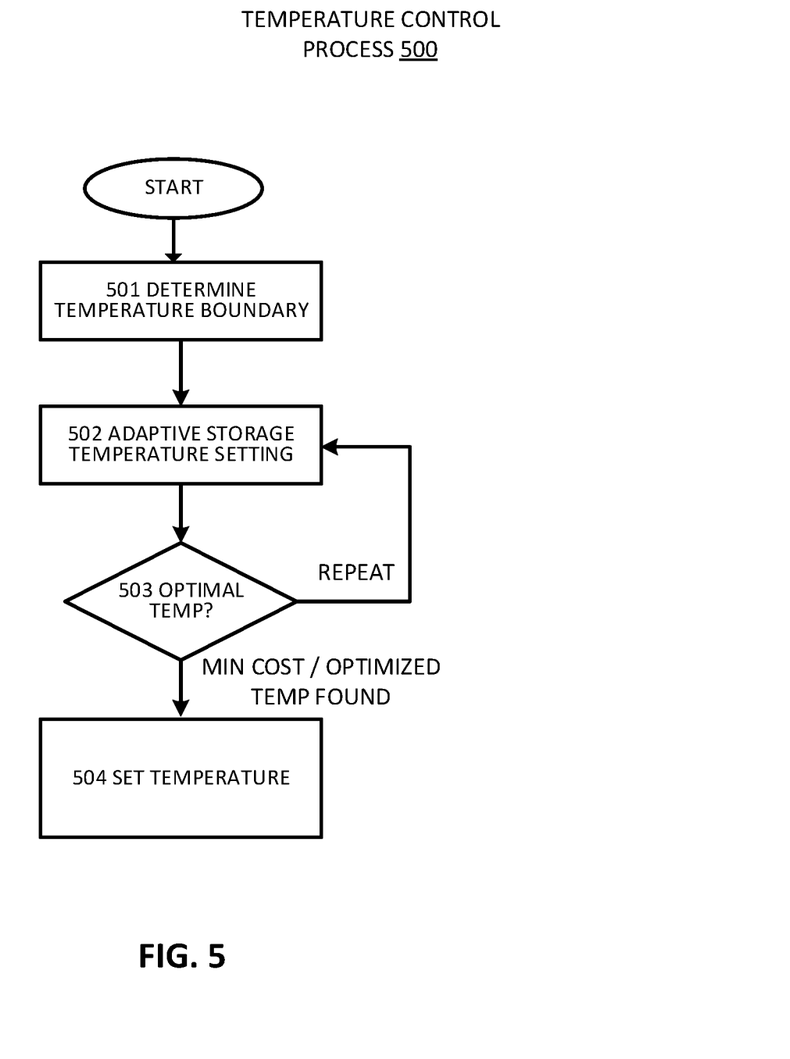
FIG. 5 shows a method of managing battery conditions, according to some embodiments.

FIG. 5 shows a temperature control process 500 for management of battery in an IT setting, according to some embodiments. At operation 501, a temperature boundary (e.g., a maximum temperature threshold and minimum temperature threshold) can be defined and set in advance. The maximum and minimum can be set according to pre-evaluation of both battery and the TEC.

At operation 502, a daily temperature setting can be fine-tuned (within the boundaries) to find the corresponding cooling cost per day and the projected battery storage time. The daily cooling cost can be, as described, a function of a) an effort required to cool the first battery (e.g., air conditioning, fan, etc.), b) an effort to replace the first battery due to battery degradation, and c) an output of the TEC. Based on the daily cooling cost, the objective function can be solved by repeating operation 502 at different temperatures until a minimal daily cooling cost is found (thereby minimizing the cost and solving for the optimized temperature). The optimized temperature, when plugged into the function, provides the minimal cost.

After finding the optimized temperature, the process proceeds to operation 504 where the temperature is set. Cooling system parameters can be determined to produce the optimal temp setting automatically such that the total cost of operation and capital cost per storage day and/or per life cycle is minimized. Under this temperature setting, an energy harvest circuit transfers the heat generated during battery discharging to electricity, to power the loads.

A cooling infrastructure consumes energy to maintain such controlled temp, which in turn, will increase the operation cost. The power and thus energy are both proportional to ambient temp in data center.

This brings the need for optimization, such as the optimization described above. For complex data center cooling infrastructure, the exact expression can be found through actual data at different temp. The operation cost of cooling system can include fan, CRAH, Chiller, and more, and can be determined as the total energy (e.g., kWh) and/or the monetary cost of that total energy.

Battery storage time is constrained, for example, in data center backup application, because a backup-battery is required to provide at least a minimum capacitance, as shown in FIGS. 3 and 4. At different storage temp, the storage time varies before hitting Cmin, a set minimum remaining capacity for end of life. The average capital expense of battery per day can be determined based on the capital expense of a battery relative to the degradation that results over storage time.

An optimization objective can include finding the optimal temperature such that total cost of cooling and battery capital expense is minimized. As can be seen from FIG. 3, for different temperatures, T1~T5, at the minimum capacity, Cmin, the storage time varies, but have a positive correlation to temperature. Thus, to achieve high resolution, a regression model can be generated based on limited temperature samples. Thus, a temperature to storage time relation can be found with unlimited resolution for fine tuning. For cycle sensitive applications, one can replace storage time in days (FIG. 3) with cycles (FIG. 4) and apply the same algorithm described above (but with cycles instead of storage time) to achieve the same result. For both storage time and cycle sensitive application, since these two parameters both have same correlation to temp, they can be combined together as two parameters in a function of temperature. In such a case, the average capital expense of battery can be determined based on the capital expense of a battery, the storage time, and the number of battery cycles.

The battery system and data center is thus capable of adaptive temp control, which can monitor the cooling cost at each temperature setting, and compare it with the projected cost/cycle or cost/storage day to find the optimal temp setting.

Thermal energy is harvested during battery discharge or charge, and converted to electrical energy using a thermoelectric component. The harvested energy can be stored in one or more separate small scale batteries (e.g., auxiliary batteries), which can be used to supplement the primary batteries (e.g., for cool down) when discharging of the primary batteries is stopped and grid power is still lost. Power is provided to IT equipment in an efficient manner while providing back-up in case of power loss and peak power conditions. Loss due to charge and discharge of batteries can be mitigated.

Figure 6:
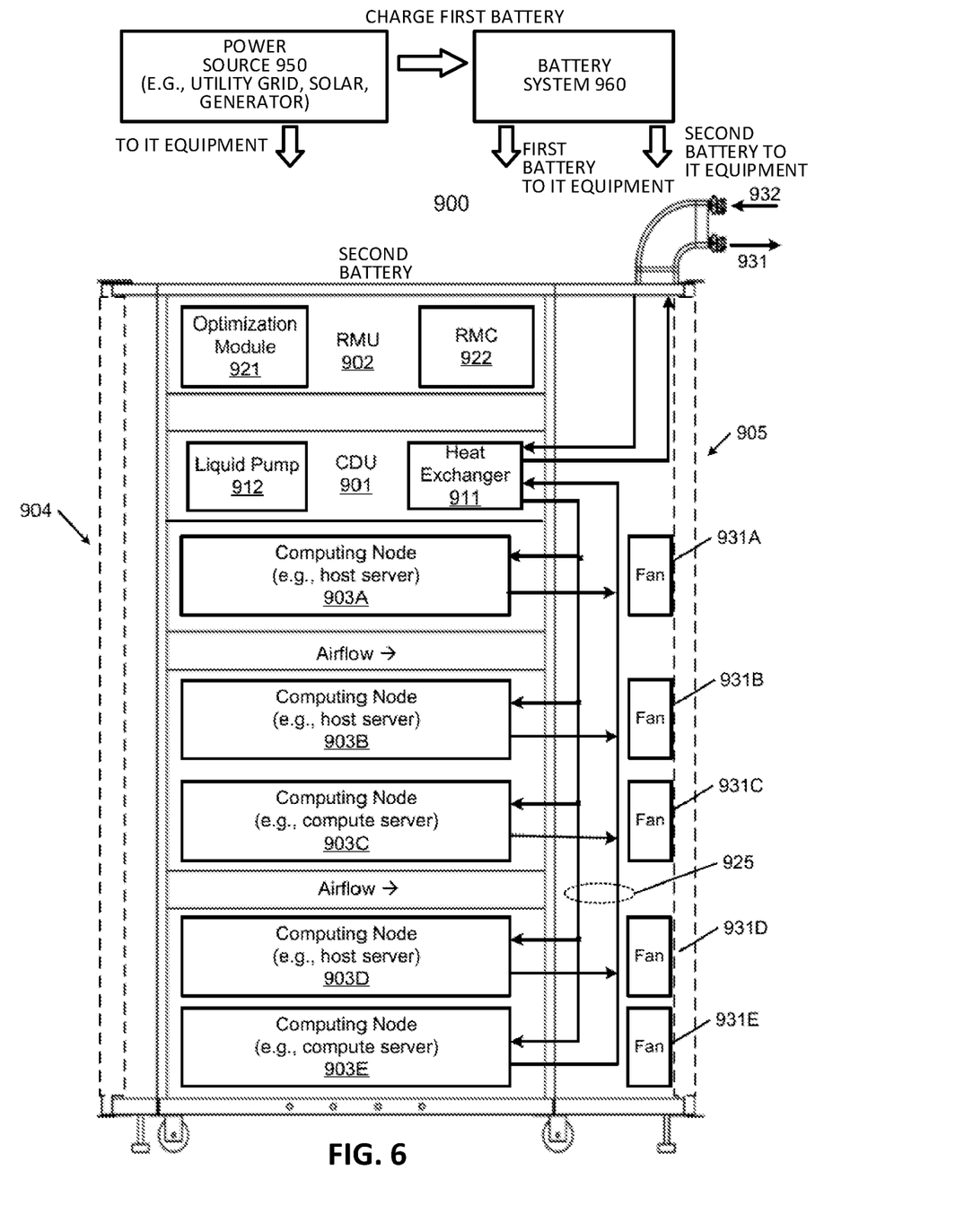
FIG. 6 shows an example IT rack, according to some embodiments.

FIG. 6 is a block diagram illustrating an example of an IT rack 900, according to some embodiments. The IT rack houses various IT equipment and provides electric power and cooling for the housed IT equipment. A data center (e.g., data center 200 of FIG. 2) can hold one or more such IT racks.

IT rack 900 may contain one or more servers, each server having one or more processing units, that can be powered from a power source 950 (e.g., utility, grid, solar, wind, generator, etc.) which can be backed up (e.g., when a power outage occurs) or supplemented (e.g., during peak demand) by a battery system 960 such as that shown in FIG. 1 or FIG. 2. As discussed, the first battery can power some IT equipment, and the second battery can power the same IT equipment, a subset of the same IT equipment, or different IT equipment in the IT rack 900. Further, the battery system can include additional primary batteries (first battery) each being associated with one or more auxiliary batteries that are charged from thermal energy produced from the primary batteries.

IT rack 900 can include, but is not limited to, CDU 901, rack management unit (RMU) 902 (optional), and one or more server blades 903A-903D (collectively referred to as server blades 903). Server blades 903 can be inserted into an array of server slots respectively from frontend 904 or backend 905 of electronic rack 900. Note that although there are only five server blades 903A-903E shown here, more or fewer server blades may be maintained within electronic rack 900. Also note that the particular positions of CDU 901, RMU 902, and server blades 903 are shown for the purpose of illustration only; other arrangements or configurations of CDU 901, RMU 902, and server blades 903 may also be implemented. Note that electronic rack 900 can be either open to the environment or partially contained by a rack container, as long as the cooling fans can generate airflows from the frontend to the backend.

In addition, for each of the server blades 903, a fan module is associated with the server blade. In this embodiment, fan modules 931A-931E, collectively referred to as fan modules 931, and are associated with server blades 903A-903E respectively. Each of the fan modules 931 includes one or more cooling fans. Fan modules 931 may be mounted on the backends of server blades 903 to generate airflows flowing from frontend 904, traveling through the airspace of the sever blades 903, and existing at backend 905 of electronic rack 900.

In one embodiment, CDU 901 mainly includes heat exchanger 911, liquid pump 912, and a pump controller (not shown), and some other components such as a liquid reservoir, a power supply, monitoring sensors and so on. Heat exchanger 911 may be a liquid-to-liquid heat exchanger. Heat exchanger 911 includes a first loop with inlet and outlet ports having a first pair of liquid connectors coupled to external liquid supply/return lines 931-932 to form a primary loop. The connectors coupled to the external liquid supply/return lines 931-932 may be disposed or mounted on backend 905 of electronic rack 900. The liquid supply/return lines 931-932 are coupled to a set of room manifolds, which are coupled to an external heat removal system, or extremal cooling loop. In addition, heat exchanger 911 further includes a second loop with two ports having a second pair of liquid connectors coupled to liquid manifold 925 to form a secondary loop, which may include a supply manifold to supply cooling liquid to server blades 903 and a return manifold to return warmer liquid back to CDU 901. Note that CDUs 901 can be any kind of CDUs commercially available or customized ones. Thus, the details of CDUs 901 will not be described herein.

In some embodiments, the data center can utilize a common cooling system to provide cooling to the IT equipment, as well as to cool the TEC of the batteries. For example, a common AC system can blow cold air to the IT room as well as the battery room. A common chiller can chill fluid that is pumped to the IT rack as well as to cooling channels that cool the TEC of the batteries.

Each of server blades 903 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling system as described above. Server blades 903 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

Electronic rack 900 further includes optional RMU 902 configured to provide and manage power supplied to servers 903, fan modules 931, and CDU 901. RMU 902 may be coupled to a power supply unit (not shown) to manage the power consumption of the power supply unit. The power supply unit may include the necessary circuitry (e.g., an alternating current (AC) to direct current (DC) or DC to DC power converter, backup battery, transformer, or regulator, etc.) to provide power to the rest of the components of electronic rack 900.

In one embodiment, RMU 902 includes optimization module 921 and rack management controller (RMC) 922. RMC 922 may include a monitor to monitor operating status of various components within electronic rack 900, such as, for example, computing nodes 903, CDU 901, and fan modules 931. Specifically, the monitor receives operating data from various sensors representing the operating environments of electronic rack 900. For example, the monitor may receive operating data representing temperatures of the processors, cooling liquid, and airflows, which may be captured and collected via various temperature sensors. The monitor may also receive data representing the fan power and pump power generated by the fan modules 931 and liquid pump 912, which may be proportional to their respective speeds. These operating data are referred to as real-time operating data. Note that the monitor may be implemented as a separate module within RMU 902.

Based on the operating data, optimization module 921 performs an optimization using a predetermined optimization function or optimization model to derive a set of optimal fan speeds for fan modules 931 and an optimal pump speed for liquid pump 912, such that the total power consumption of liquid pump 912 and fan modules 931 reaches minimum, while the operating data associated with liquid pump 912 and cooling fans of fan modules 931 are within their respective designed specifications. Once the optimal pump speed and optimal fan speeds have been determined, RMC 922 configures liquid pump 912 and cooling fans of fan modules 931 based on the optimal pump speed and fan speeds.

As an example, based on the optimal pump speed, RMC 922 communicates with a pump controller of CDU 901 to control the speed of liquid pump 912, which in turn controls a liquid flow rate of cooling liquid supplied to the liquid manifold 925 to be distributed to at least some of server blades 903. Therefore, the operating condition and the corresponding cooling device performance is adjusted. Similarly, based on the optimal fan speeds, RMC 922 communicates with each of the fan modules 931 to control the speed of each cooling fan of the fan modules 931, which in turn control the airflow rates of the fan modules 931. Note that each of fan modules 931 may be individually controlled with its specific optimal fan speed, and different fan modules and/or different cooling fans within the same fan module may have different optimal fan speeds.

Some embodiments may include a non-transitory machine-readable medium (such as microelectronic memory) having stored thereon instructions, which program one or more data processing components (generically referred to here as a "processor") to perform temperature control operations. In some embodiments, temperature control operations can be performed using known control techniques such as a proportional integral (PI) controller, a proportional integral differential (PID) controller, or other equivalent control techniques that utilize the battery temperature as feedback. A controller (e.g., controller 206 as shown in FIG. 2) can include one or more processing components and/or non-transitory machine-readable medium.

In some embodiments, some of these operations might be performed by specific hardware components that contain hardwired logic. Those operations might alternatively be performed by any combination of programmed data processing components and fixed hardwired circuit components.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A battery system, comprising:
a first battery having one or more battery cells;
a thermoelectric component (TEC) having thermoelectric materials therein to form a hot region and a cold region, the hot region being thermally connected to a region of the first battery, wherein the TEC is configured to generate a first voltage based on a temperature difference between the hot region and the cold region due to thermoelectric effect;
a voltage converter coupled to the TEC to boost the first voltage produced by the TEC to produce a second voltage that is higher than the first voltage; and
a second battery electrically connected to an output of the voltage converter, wherein the second voltage is utilized to charge the second battery and wherein the second battery has a smaller capacity than the first battery,
wherein a controller is configured to operate air conditioning or a fan to maintain an optimized ambient temperature in which the first battery is stored in, the optimized ambient temperature determined based on minimizing an effort to cool the first battery, minimizing a degradation of the first battery, and maximizing output of the TEC.

2. The battery system of claim 1, wherein a controller is configured to electrically connect the first battery to information technology (IT) equipment of a data center when a primary power source is absent or when an electrical demand of the IT equipment exceeds a threshold.

3. The battery system of claim 2, wherein the controller is configured to electrically connect the second battery to the IT equipment or a portion of the IT equipment.

4. The battery system of claim 1, wherein an air cooling system directs air at the cold region or a cold plate connected to the cold region of the TEC.

5. The battery system of claim 1, wherein a liquid cooling system circulates a fluid through one or more channels that is thermally coupled to the cold region or a cold plate that is thermally connected to the cold region.

6. The battery system of claim 1, wherein the first battery and the second battery are located in a battery room of a data center, electrically connected to IT equipment in an IT room of the data center, and a controller is configured to manage a temperature in the battery room with a fan or air conditioner.

7. The battery system of claim 1, further comprising a third battery that is electrically connected to the voltage output of the voltage converter.

8. The battery system of claim 7, wherein a switch alternates connection between a) the second battery and the IT equipment, and b) the third battery and the IT equipment.

9. The battery system of claim 1, wherein the first battery uses the TEC, and not another cooling structure, for cooling the first battery.

10. A data center, comprising:
information technology (IT) equipment;
a first battery having one or more battery cells to provide power to the IT equipment;
a thermoelectric component (TEC) having thermoelectric materials therein to form a hot region and a cold region, the hot region being thermally connected to a region of the first battery, wherein the TEC is configured to generate a first voltage based on a temperature difference between the hot region and the cold region due to thermoelectric effect;

a voltage converter coupled to the TEC to boost the first voltage produced by the TEC to produce a second voltage that is higher than the first voltage; and a second battery electrically connected to an output of the voltage converter, wherein the second voltage is utilized to charge the second battery and wherein the second battery has a smaller capacity than the first battery, wherein a controller is configured to operate air conditioning or a fan to maintain an optimized ambient temperature in which the first battery is stored in, the optimized ambient temperature determined based on minimizing an effort to cool the first battery, minimizing a degradation of the first battery, and maximizing output of the TEC.

11. The data center of claim 10, wherein a controller is configured to electrically connect the first battery the IT equipment of a data center when a primary power source is absent or when an electrical demand of the IT equipment exceeds a threshold.

12. The data center of claim 11, wherein the controller is configured to electrically connect the second battery to the IT equipment or a portion of the IT equipment.

13. The data center of claim 10, wherein an air cooling system directs air at the cold region or a cold plate connected to the cold region of the TEC.

14. The data center of claim 10, wherein a liquid cooling system circulates a fluid through one or more channels that is thermally coupled to the cold region or a cold plate that is thermally connected to the cold region.

15. The data center of claim 10, wherein the first battery and the second battery are located in a battery room of a data center, electrically connected to the IT equipment that is located in an IT room of the data center, and a controller is configured to manage a temperature in the battery room with a fan or air conditioner.

16. The data center of claim 10, further comprising a third battery that is electrically connected to the voltage output of the voltage converter.

17. The data center of claim 16, wherein a switch alternates connection between a) the second battery and the IT equipment, and b) the third battery and the IT equipment.

18. The data center of claim 10, wherein the first battery uses the TEC, and not another cooling structure, for cooling the first battery.

* * * * *